United States Patent

[11] 3,570,638

[72] Inventor Peter F. Baker
 Benarth, Conway, Wales
[21] Appl. No. 820,496
[22] Filed Apr. 30, 1969
[45] Patented Mar. 16, 1971
[73] Assignee Quinton Hazell (Holdings) Limited
 North Wales, Great Britain
[32] Priority May 3, 1968
[33] Great Britain
[31] 20999/68

[54] DIAPHRAGM SPRING CLUTCH ASSEMBLY
 12 Claims, 10 Drawing Figs.
[52] U.S. Cl. .................................................. 192/70.27,
 192/89
[51] Int. Cl. .................................................. F16d 13/50
[50] Field of Search .................................................. 192/70.27,
 70.28, 70.29, 89, 89 (B)

[56] References Cited
UNITED STATES PATENTS

| | | | |
|---|---|---|---|
| 1,644,548 | 10/1927 | Spase | 192/70.27(X) |
| 2,138,169 | 11/1938 | Hunt | 192/70.27 |
| 2,630,897 | 3/1953 | Porter | 192/89(B) |
| 2,885,047 | 5/1959 | Kehrl | 192/89(B)(X) |
| 2,952,453 | 9/1960 | Haussermann | 192/89(B)(X) |
| 3,361,239 | 1/1968 | Binder | 192/89(B) |

Primary Examiner—Allan D. Herrmann
Attorney—Friedman & Goodman

ABSTRACT: A friction clutch diaphragm spring having radially inwardly extending fingers at least one of which is deformed at its inner end so that the inner ends of the fingers can bear simultaneously on opposite sides of a groove in a thrust means to prevent vibration between the diaphragm spring and the thrust means and thus prevent rattling occurring at least when the clutch is in the engaged position.

PATENTED MAR 16 1971

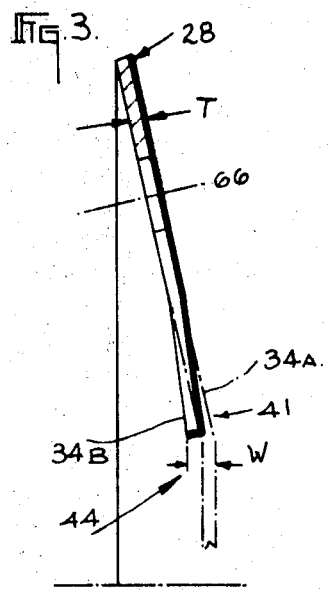
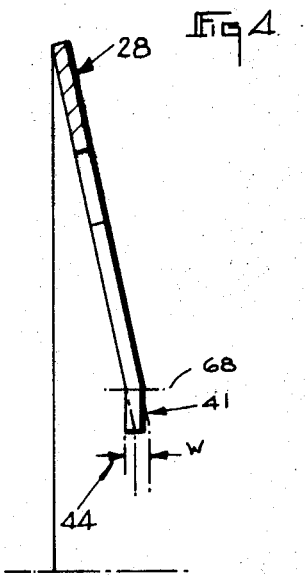
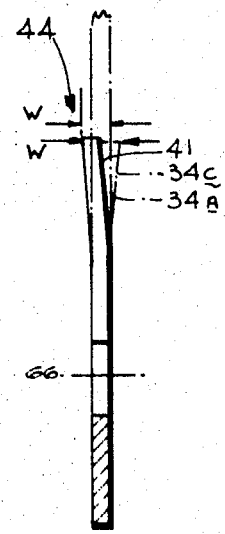
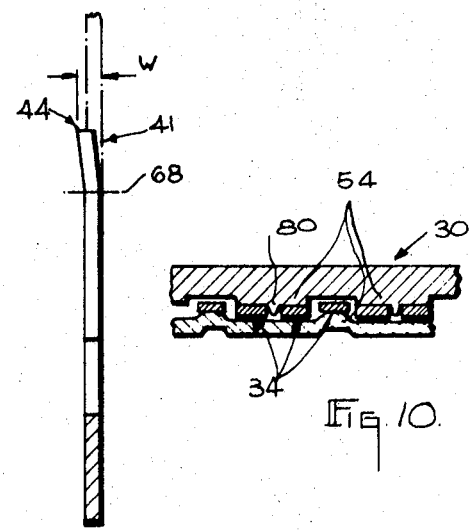
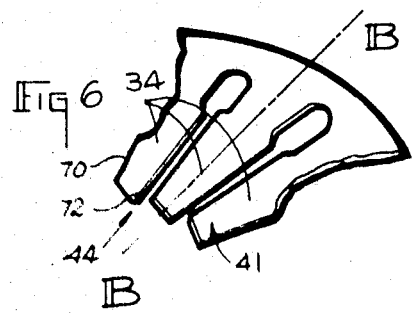
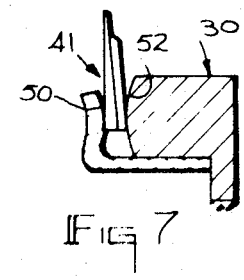

3,570,638

DIAPHRAGM SPRING CLUTCH ASSEMBLY

BRIEF SUMMARY OF THE INVENTION

According to the present invention there is provided a diaphragm spring for a friction clutch, the diaphragm spring having radially inwardly extending fingers which, at their radially inner ends, form a radially inner portion defining a central aperture characterized in that the overall width "W" of the radially inner portion is wider axially than the thickness "T" of the material of which said spring is made so as to be capable of bearing simultaneously with spring pressure on opposite sides of a groove in a thrust means to prevent relative vibration between the diaphragm spring and the thrust means at least when the clutch is in an engaged position.

BRIEF DESCRIPTION OF THE DRAWINGS

The invention will now be more particular described by way of example with reference to the accompanying drawings in which:

FIG. 3 is a cross-sectional view of one form of diaphragm spring of which the upper half is shown in a free position and of which the lower half is shown in an engaged position of the clutch;

FIG. 4 is a similar view to FIG. 3 but showing another form of diaphragm spring;

FIG. 6 is a fragmentary perspective view of a further form of diaphragm spring;

FIG. 7 is a fragmentary sectional view of the diaphragm spring shown in FIG. 6 in engagement with a thrust means;

FIG. 10 is a developed diagrammatic sectional edge view of a fragmentary part of a unit showing a different form of thrust means.

DESCRIPTION OF THE PREFERRED EMBODIMENT

Figure 1:
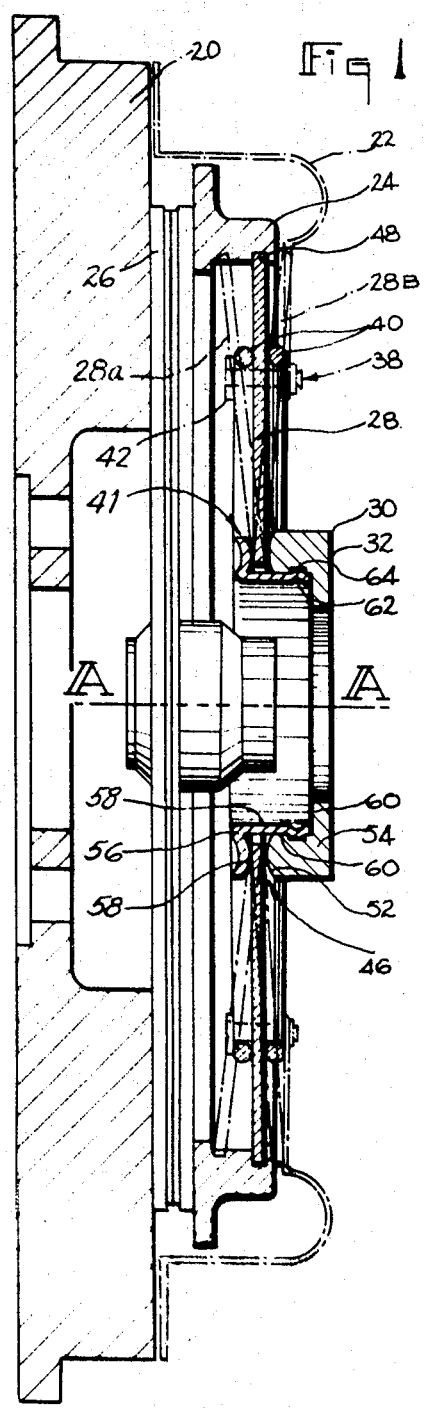
FIG. 1 is a longitudinal sectional view of a friction clutch on lines indicated at II-II in FIG. 2 and shown in an engaged position and also showing the diaphragm spring in dotted lines in a free position and in a disengaged position of the clutch.

For convenience similar reference numerals will be used through the several views to denote corresponding parts.

The friction clutch illustrated in FIG. 1 is intended for a motor driven road vehicle and comprises a flywheel 20 which forms the driving plate of the clutch as is well known and to the flywheel is bolted a cover 22 and mounted within the cover is a pressure plate 24 which rotates with the flywheel 20 and between the flywheel 20 and the pressure plate 24 is disposed a driven friction plate 26 which is associated with a driven shaft in any convenient manner not shown.

The clutch also comprises a unit including a diaphragm spring 28 and a thrust means 30 which affords a face 32 capable of cooperating with a clutch release thrust device, not shown, which is movable parallel with the axis A-A of the clutch by, for example, a clutch pedal in order to control the clutch.

The diaphragm spring 28 comprises an outer imperforate rim from which extends radially inwardly a plurality of, for example, 12 fingers 34 although it should be appreciated that the diaphragm spring may be formed with any suitable number of fingers such as, for example, 18 fingers. The fingers are separated by radial slots 36 which are formed with enlarged openings at their radially outer ends to receive the shanks of headed pins 38 secured to the cover 22 and on which pins are supported two fulcrum rings 40 which bear against the heads 42 of the pins and against the cover 22 and the diaphragm spring is disposed between the rings at a position between the radially inner and outer edges of said spring as shown in FIG. 1.

The radially inner ends of the fingers 34 form a radially inner portion 41 defining a central aperture 44 and said ends are located in a continuous annular groove 46 formed in the thrust means 30 while the outer peripheral edge portion 48 of the diaphragm spring is associated in any convenient manner, which is diagrammatically illustrated in FIG. 1, with the pressure plate 24, so that when the thrust means 30 is moved towards the left as shown in FIG. 1 the pressure plate 24 is moved towards the right and vice versa in a known manner.

The thrust means 30 is made of nonresilient metal or plastics material or any other suitable material and provides two opposite rigid shoulders 50 and 52 which assist in defining the groove 46 and while said shoulders are of curved cross-sectional shape as shown in FIG. 7 they may be of any other convenient cross-sectional shape.

Figure 5:
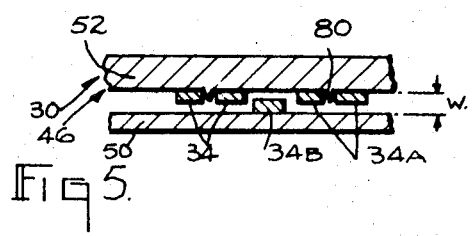
FIG. 5 is a developed diagrammatic sectional edge view of a fragmentary part of a unit comprising a part of a diaphragm spring and a thrust means with the clutch in an engaged position.
Figure 8:
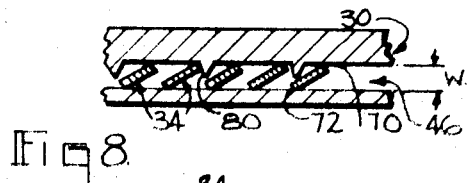
FIG. 8 is a developed diagrammatic sectional edge view of a fragmentary part of a unit similar to FIG. 5 but including the diaphragm spring as shown in FIGS. 6 and 7.
Figure 9:
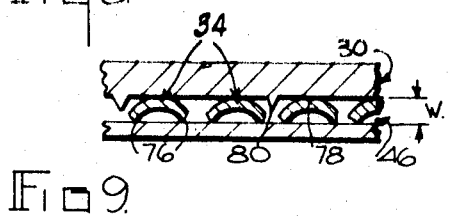
FIG. 9 is a developed diagrammatic sectional edge view of a fragmentary part of a unit showing a still further form of diaphragm spring.

As shown in FIGS. 1, 5, 7, 8 and 9 of the drawings each shoulder is circumferentially smooth, i.e. is nonundulatory around any circumferential circular path on the surface of the shoulder and about the axis A-A, except for projections 80 hereinafter referred to, so that each shoulder is straight as viewed in side elevation of the thrust means as seen in FIGS. 5, 8 and 9.

Alternatively, however, one or both of the faces or shoulders of the thrust means 30 may be of castellated formation as indicated at 54 in FIG. 10.

Whether the shoulders are as shown in FIGS. 1, 5, 7, 8 and 9 or as shown in FIG. 10, the fingers bear with spring pressure at positions which, on the respective shoulders, are in common planes as clearly shown in FIGS. 5, 8, 9 and 10.

Figure 2:
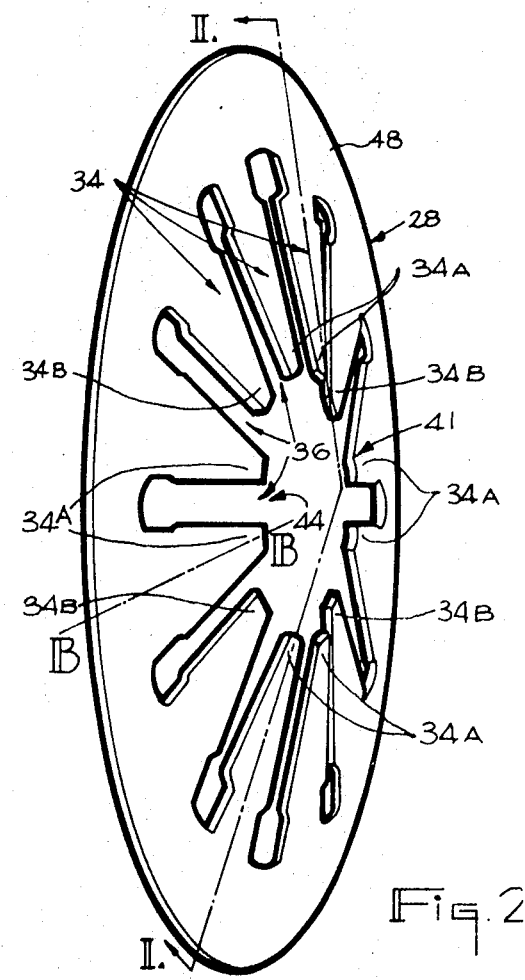
FIG. 2 is a perspective view of the diaphragm spring in a free position.

The diaphragm spring 28 is shown in FIG. 1 in full lines in the position it occupies when the clutch is engaged and in this position the diaphragm spring is stressed and also in FIG. 1 the diaphragm spring is indicated in dotted lines at 28A in a free unstressed position as also shown in FIG. 2 and the upper halves of FIGS. 3 and 4, this being the position and form the diaphragm spring assumes before assembly into the clutch. Also in FIG. 1 the diaphragm spring 28 is shown in dotted lines at 28B in the position the diaphragm spring assumes when the clutch is in the disengaged position and said spring is stressed further than when the clutch is in the engaged position.

The thrust means 30 comprises a nonresilient metal thrust member 54 providing the face 32 and a nonresilient metal retaining member 56 which includes a sleeve 58 received within a bore 60 formed in the thrust member 54 and an end wall of the sleeve 58 abuts an annular abutment wall 60 of the thrust member 54 whereby the shoulder 50 is correctly positioned in a fixed axially spaced apart relationship to the shoulder 52 to form the groove 46.

The thrust means 30 comprising the thrust member 54 and the retaining member 56 is applied to the diaphragm spring 28 before the two members 54 and 56 are placed together and subsequently the two members are secured together with the fingers 34 between the shoulders 50 and 52 by pressing radial projections 62 outwardly from the sleeve 58 to engage an annular groove or recess 64 in the bore 60 of the thrust member 54 and conveniently six such radial projections are provided and are equiangularly spaced apart. The engagement of the radial projections 62 with the annular groove 64 may be relied upon to relatively position the two members 54 and 56 in correct angular relationship but additionally these two members may be keyed together.

In order to prevent relative vibration and thus rattling occurring between the diaphragm spring 28 and the thrust means 30 at least when the clutch is in an engaged position the diaphragm spring is formed so that the overall width of the radially inner portion of said spring is wider axially as indicated at 'W' than the thickness 'T' of the material of which the spring is made so that said spring is capable of bearing simultaneously with spring pressure on opposite sides of the groove 46 in the thrust means 30 and which groove is wider than the thickness 'T', to prevent relative vibration between the diaphragm spring and the thrust means at least when the clutch is in an engaged position. Thus it is not necessary to employ a Bellville washer for the purpose of preventing vibration and rattling.

Referring to FIGS. 2, 3, 4 and 5, two fingers 34A are of normal straight formation in cross section along a radial axis B–B whereas the third finger 34B of each three fingers is bent as shown in FIG. 3 either sharply or in a gradual curve about a bend line 66 adjacent the radially outer ends of the fingers or about a bend line 68 adjacent the radially inner ends of the fingers so that the radially inner end of the finger 34B is wholly displaced relatively to the fingers 34A.

The relative set of the fingers 34A and 34B is such that the overall axial width 'W' of the radially inner portion of the diaphragm spring or fingers in the free unstressed position is greater than the width of the groove 46 so that when the fingers are engaged with the groove 46 of the thrust means 30, the fingers bear simultaneously on the opposite shoulders 50 and 52 and prevent relative vibration and rattling between the diaphragm spring and the thrust means when the clutch is in a clutch engaged position but said fingers do not bear simultaneously on the two shoulders 50 and 52 when the clutch is in the clutch disengaged position.

It should be appreciated that there are preferably a plurality of fingers 34A and a plurality of fingers 34B spaced at intervals around the diaphragm spring so that a balanced engagement between the diaphragm spring and the thrust means is obtained around these two parts.

Instead of only the fingers 34B being bent, fingers 34C may also be bent but in an axial direction opposite to the direction in which the fingers 34B are bent as indicated in FIG. 3.

Referring to FIGS. 6, 7 and 8 the fingers 34 of the diaphragm spring 28 are bent or twisted about the radial axis B–B so that the two opposite substantially radial edges 70 and 72 are axially spaced apart so that the edge 70 bears against one shoulder of the groove 46 and simultaneously the other edge 72 bears against the other shoulder of said groove except when the clutch is in a clutch disengaged position. It should be appreciated that one or more but not necessarily all of the fingers 34 of a diaphragm spring need be twisted.

Referring to FIG. 9 a finger 34 is deformed so as to be of substantially curved channel-shape in cross section so that substantially radial edges 76 of the finger are axially spaced from a central part or base 78 of the finger disposed circumferentially between said edges 76. Thus the substantially radial edges 76 bear against one shoulder of the groove 46 and simultaneously the other part or base 78 of the finger bears against the other shoulder of the groove 46 except when the clutch is in a clutch disengaged position.

It should be appreciated that in the form of the diaphragm spring illustrated in FIG. 9 one or more but not necessarily all of the fingers need be deformed or bent into channel cross-sectional formation.

Formed on the shoulder 52 of the thrust member 54 are axial projections, for example, four equiangularly spaced apart axial projections 80 previously mentioned and which are positioned to engage the slots 36 between adjacent fingers 34 so that the thrust means 30 and the diaphragm spring 28 rotate together but instead of providing said axial projections 80 on the thrust member 54 said projections may be provided on the retaining member 56.

The invention thus provides a diaphragm spring which can engage a groove in a thrust means so that both shoulders of the annular groove are simultaneously engaged by the diaphragm spring to prevent relative vibration between these two parts and thus prevent rattling occurring especially when the clutch is in an engaged position and furthermore provides a unit for a friction clutch comprising such a diaphragm spring and thrust means and provides a friction clutch assembly comprising such a unit and a cover and a pressure plate and also provides a friction clutch comprising such a friction clutch assembly and the unit, assembly or friction clutch is more simple and less expensive than known friction clutches of the kind specified.

I claim:

1. A diaphragm spring for a friction clutch said diaphragm spring (28) having an outer imperforate rim and fingers (34) which extend radially inwardly therefrom and which, at their radially inner ends, form a radially inner portion (41) defining a central aperture (44) wherein the improvement comprises at least one finger (34) being deformed so that parts (70,72) or (76, 78) of the radially inner end of said one finger are axially spaced apart a distance such that the overall width "W" of said one finger and thus said radially inner portion is wider axially than the thickness "T" of the material of which the spring is made so as to be capable of bearing simultaneously with spring pressure on opposite sides (50, 52) of a groove (46) in a thrust means (30) to prevent relative vibration between the diaphragm spring and the thrust means at least when the clutch is in an engaged position.

2. A diaphragm spring according to claim 1 wherein the improvement comprises the said one finger (34) being deformed about a radial axis thereof so that substantially opposite radial edges (70,72) of said one finger are axially spaced apart to afford the width "W."

3. A diaphragm spring according to claim 1 wherein the improvement comprises the said one finger (34) being deformed and of channel shape in cross section so that substantially radial edges (76) of said one finger are axially spaced from a part (78) of said one finger disposed circumferentially between said radial edges to afford the width "W."

4. A unit for a friction clutch comprising a diaphragm spring (28) having an outer imperforate rim and fingers (34) which extend radially inwardly therefrom and which, at their radially inner ends, form a radially inner portion defining a central aperture (44) and a thrust means (30) which is disposed in said central aperture and is engaged by the radially inner ends of said fingers wherein the improvement comprises at least one finger (34) being deformed so that the overall width "W" of said radially inner portion is wider axially than the thickness "T" of the material of which said spring is made and a continuous annular groove (46) is formed in the thrust means and affords two axially spaced apart rigid shoulders (50,52) which are spaced apart a fixed distance greater than the thickness "T" and said one finger at least and the remaining fingers bear with spring pressure simultaneously on said rigid shoulders at positions which, on the respective shoulders, are in common planes, to prevent relative vibration between the diaphragm spring and the thrust means at least when the clutch is in an engaged position.

5. A unit for a friction clutch according to claim 4 wherein the improvement comprises the said one finger (34) being deformed about a radial axis thereof so that substantially opposite radial edges (70,72) of said one finger are axially spaced apart to afford the width "W,"said opposite radial edges bearing with spring pressure simultaneously on the spaced apart rigid shoulders (50,52) of the continuous groove at least when the clutch is in an engaged position.

6. A unit for a friction clutch according to claim 4 wherein the improvement comprises the said one finger (34) being deformed and of channel shape in cross section so that substantially radial edges (76) of said one finger are axially spaced from a part (78) of the finger disposed circumferentially between said radial edges to afford the width "W,"-said substantially radial edges (76) and the part (78) disposed circumferentially therebetween bearing with spring pressure simultaneously on the spaced apart rigid shoulders (50,52) of the continuous groove at least when the clutch is in an engaged position.

7. A friction clutch assembly wherein the improvement comprises a unit according to claim 4, a cover (22) supporting a fulcrum (40) for the diaphragm spring between the radially inner portion (41) and the outer imperforate rim of said spring and a pressure plate (24) with which said outer imperforate rim of the spring cooperates to move said pressure plate axially.

8. A friction clutch assembly wherein the improvement comprises a unit according to claim 5, a cover (22) supporting a fulcrum (40) for the diaphragm spring between the radially inner portion (41) and the outer imperforate rim of said spring and a pressure plate (24) with which said outer imperforate rim of the spring cooperates to move said pressure plate axially.

9. A friction clutch assembly wherein the improvement comprises a unit according to claim 6, a cover (22) supporting a fulcrum (40) for the diaphragm spring between the radially inner portion (41) and the outer imperforate rim of said spring and a pressure plate (24) with which said outer imperforate rim of the spring cooperates to move said pressure plate axially.

10. A friction clutch wherein the improvement comprises a friction clutch assembly according to claim 7, of which the cover (22) is secured to a driving plate (20) and a driven plate (26) is disposed between the driving plate (20) and the pressure plate (24).

11. A friction clutch wherein the improvement comprises a friction clutch assembly according to claim 8 of which the cover (22) is secured to a driving plate (20) and a driven plate (26) is disposed between the driving plate (20) and the pressure plate (24).

12. A friction clutch wherein the improvement comprises a friction clutch assembly according to claim 9 of which the cover (22) is secured to a driving plate (20) and a driven plate (26) is disposed between the driving plate (20) and the pressure plate (24).